(12) United States Patent
Ma

(10) Patent No.: US 9,968,168 B2
(45) Date of Patent: May 15, 2018

(54) FUNCTIONAL UMBRELLA

(71) Applicant: Oliver Jeon-an Ma, Baldwin Park, CA (US)

(72) Inventor: Oliver Jeon-an Ma, Baldwin Park, CA (US)

(*) Notice: Subject to any disclaimer, the term of this patent is extended or adjusted under 35 U.S.C. 154(b) by 0 days. days.

(21) Appl. No.: 15/269,980

(22) Filed: Sep. 19, 2016

(65) Prior Publication Data

US 2018/0078012 A1  Mar. 22, 2018

(51) Int. Cl.
| | | |
|---|---|---|
| A45B 3/02 | (2006.01) | |
| A45B 3/04 | (2006.01) | |
| A45B 3/00 | (2006.01) | |
| A45B 25/00 | (2006.01) | |
| A45B 25/10 | (2006.01) | |
| A45B 23/00 | (2006.01) | |

(52) U.S. Cl.
CPC ................ *A45B 25/10* (2013.01); *A45B 3/02* (2013.01); *A45B 3/04* (2013.01); *A45B 2023/0037* (2013.01); *A45B 2200/1018* (2013.01); *A45B 2200/1027* (2013.01); *A45B 2200/1036* (2013.01); *A45B 2200/1045* (2013.01)

(58) Field of Classification Search
CPC .. A45B 25/10; A45B 3/04; A45B 3/02; A45B 2200/1036; A45B 2200/1045; A45B 2023/0037; A45B 2200/1018; A45B 2200/1027
USPC ....................................... 135/16, 33.41, 910
See application file for complete search history.

(56) References Cited

U.S. PATENT DOCUMENTS

| | | | | | |
|---|---|---|---|---|---|
| 1,051,698 | A | * | 1/1913 | Daggett ................. | A45B 15/00 135/33.41 |
| 2,474,516 | A | * | 6/1949 | Daniel ................... | A45B 23/00 135/15.1 |
| 4,061,154 | A | * | 12/1977 | Cox ....................... | A45B 15/00 135/33.41 |
| 4,962,779 | A | * | 10/1990 | Meng ...................... | A45B 3/00 135/16 |
| 5,429,147 | A | * | 7/1995 | Barrington ............ | A45B 15/00 135/33.41 |
| 5,758,678 | A | * | 6/1998 | Wu ........................ | A45B 25/10 135/33.41 |
| 6,126,293 | A | * | 10/2000 | Wu ......................... | A45B 3/04 135/910 |
| 6,135,605 | A | * | 10/2000 | Hsu ........................ | A45B 3/04 362/102 |

(Continued)

*Primary Examiner* — Robert Canfield
(74) *Attorney, Agent, or Firm* — Raymond Y. Chan; David and Raymond Patent Firm

(57) ABSTRACT

An umbrella includes a supporting frame, an umbrella frame supported by the supporting frame, an umbrella awning, and a functional module. The umbrella includes a guiding arm, an upper hub securely coupled at a top end of the guiding arm, a plurality of awning arms radially and pivotally extended from the upper hub, and an awning cap detachably coupled on the upper hub. The umbrella awning is supported by the awning arms to define a shading area under the umbrella awning, wherein a center portion of the umbrella awning is securely sandwiched between the upper hub and the awning cap to retain the umbrella awning in position. The functional module is detachably coupled on the awning cap for providing an additional function of the umbrella.

5 Claims, 7 Drawing Sheets

(56) References Cited

U.S. PATENT DOCUMENTS

| | | | | |
|---|---|---|---|---|
| 6,158,451 A * | 12/2000 | Wu | A45B 3/04 | 135/16 |
| 6,382,809 B1 * | 5/2002 | Ou-Yang | A45B 3/04 | 135/910 |
| 7,604,015 B2 * | 10/2009 | Fraser | A45B 3/04 | 135/16 |
| 8,069,868 B2 * | 12/2011 | Kuelbs | A45B 3/00 | 135/16 |
| 8,375,966 B2 * | 2/2013 | Kuelbs | A45B 3/00 | 135/16 |
| 9,030,829 B2 * | 5/2015 | Ma | A45B 3/00 | 135/16 |
| 2003/0000559 A1 * | 1/2003 | Wu | A45B 3/04 | 135/16 |
| 2003/0015231 A1 * | 1/2003 | Ma | A45B 25/10 | 135/33.6 |
| 2003/0084931 A1 * | 5/2003 | Lee | A45B 3/04 | 135/16 |
| 2003/0218876 A1 * | 11/2003 | Wu | A45B 3/04 | 362/102 |
| 2004/0031510 A1 * | 2/2004 | Li | A45B 3/00 | 135/21 |
| 2004/0255994 A1 * | 12/2004 | Clarke | A45B 23/00 | 135/39 |
| 2006/0005869 A1 * | 1/2006 | Kuelbs | A45B 3/00 | 135/20.3 |
| 2006/0266398 A1 * | 11/2006 | Wu | A45B 3/04 | 135/91 |
| 2006/0272686 A1 * | 12/2006 | Tung | A45B 3/04 | 135/16 |
| 2007/0041183 A1 * | 2/2007 | Su | A45B 3/04 | 362/191 |
| 2007/0058360 A1 * | 3/2007 | Li | A45B 3/04 | 362/102 |
| 2007/0074751 A1 * | 4/2007 | Fraser | A45B 3/04 | 135/98 |
| 2009/0056775 A1 * | 3/2009 | Kuelbs | A45B 3/04 | 135/16 |
| 2009/0260663 A1 * | 10/2009 | Lewis | A45B 3/02 | 135/16 |
| 2010/0192999 A1 * | 8/2010 | Li | A45B 3/02 | 135/96 |
| 2011/0232706 A1 * | 9/2011 | Stoelinga | A45B 25/14 | 135/20.3 |
| 2012/0325278 A1 * | 12/2012 | Kuelbs | A45B 3/00 | 135/16 |
| 2014/0096802 A1 * | 4/2014 | Volin | A45B 25/143 | 135/16 |
| 2015/0362171 A1 * | 12/2015 | Li | F21V 33/006 | 362/102 |

* cited by examiner

FUNCTIONAL UMBRELLA

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to an outdoor umbrella, and more particularly to a functional umbrella, which comprises a functional module adapted for incorporating with any existing outdoor umbrella without affecting the operation thereof.

Description of Related Arts

A conventional outdoor umbrella usually comprises a supporting base, a central stem upwardly extended from the supporting base, and an awning extended from a top portion of the central stem to provide shading for a predetermined shading area under an awning attached onto the awning frame. This kind of conventional outdoor umbrella has widely been utilized all around the nation for shading sunlight and providing a place where a wide variety of outdoor activities may take place. In order to enhance the performance and function of a typical outdoor umbrella, many inventions have been made to incorporate with a typical outdoor umbrella for achieving additional utility functions of that outdoor umbrella. For example, solar energy systems and illumination systems have been developed provide an environmentally-friendly energy source and illumination to outdoor umbrellas.

For example, U.S. Pat. Nos. 6,612,713, 8,069,868, and 8,375,966 disclosed an umbrella apparatus which comprises a vertical umbrella pole, a top cap supported at a top end of the umbrella pole, a canopy rested on the top cap, and a solar energy system coupled at the top end of the umbrella pole for collecting solar energy. However, the umbrella apparatus has several drawbacks. The canopy is retained by sandwiching between the top end of the umbrella pole and the solar energy system. In other words, when the solar energy system is detached from the umbrella pole, the canopy cannot be securely attached to the umbrella pole. As a result, the umbrella apparatus cannot be operated to fold and unfold the canopy.

Another drawback of the umbrella apparatus is that the top cap, the canopy, and the solar energy system are supported by the umbrella pole. Therefore, the umbrella pole serves as a main pole to support all the umbrella components, such that the umbrella pole must be rigid enough to ensure the operation of the umbrella apparatus. Once the umbrella pole is broken, the umbrella apparatus cannot be operated.

In addition, the umbrella apparatus further comprises a rechargeable battery supported in the umbrella pole and electrically connected to the solar energy system. Therefore, the electrical configuration of the umbrella apparatus is complicated since the wiring configuration must be passed through the umbrella pole. When the rechargeable battery is malfunctioned, it is impossible for the user to replace the rechargeable battery.

The structure of the umbrella pole will limit the design of the umbrella apparatus. The solar energy system can only incorporate with the standard pole umbrella because it includes the umbrella pole. In other words, the solar energy system can only incorporate with the cantilever umbrella because the canopy is supported by a cantilever arm which is extended from the umbrella pole.

SUMMARY OF THE PRESENT INVENTION

The invention is advantageous in that it provides a functional umbrella, which comprises a functional module adapted for incorporating with any existing outdoor umbrella without affecting the operation thereof.

Another advantage of the invention is to provide a functional umbrella, wherein the umbrella awning is securely by the umbrella frame even when the functional module is detached from the umbrella frame.

Another advantage of the invention is to provide a functional umbrella, wherein the functional module serves as a solar module for collecting solar energy and for converting the solar energy into electrical energy so as to apply an electrical appliance at the umbrella frame.

Another advantage of the invention is to provide a functional umbrella, wherein the functional module can be incorporated with the standard pole umbrella or the cantilever umbrella.

Another object of the present invention is to provide a functional umbrella, wherein the functional module provides an independent, environmentally-friendly and economical power source to the electronic appliance.

Another object of the present invention is to provide a functional umbrella, wherein the functional module can collect solar energy during daytime when the umbrella is in normal operation, and deliver electrical energy to the electrical appliance during nighttime such as providing the light in a fairly dark environment. In other words, no intentional charging process is required when the umbrella is not in use.

Another object of the present invention is to provide a functional umbrella incorporated with the functional module which does not significantly alter the original structure of the umbrella, so as to minimize the manufacturing and marketing costs of the umbrella.

Another object of the present invention is to provide a functional umbrella, wherein no complicated mechanical and electrical process are involved in installing and mounting the functional module and electrical appliance on the umbrella.

Additional advantages and features of the invention will become apparent from the description which follows, and may be realized by means of the instrumentalities and combinations particular point out in the appended claims.

According to the present invention, the foregoing and other objects and advantages are attained by an umbrella, comprising:

a supporting frame;

an umbrella frame, which is supported by the supporting frame, comprising a guiding arm, an upper hub securely coupled at a top end of the guiding arm, a plurality of awning arms radially and pivotally extended from the upper hub, and an awning cap detachably coupled on the upper hub;

an umbrella awning supported by the awning arms to define a shading area under the umbrella awning, wherein a center portion of the umbrella awning is securely sandwiched between the upper hub and the awning cap to retain the umbrella awning in position; and a functional module detachably coupled on the awning cap for providing an additional function.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
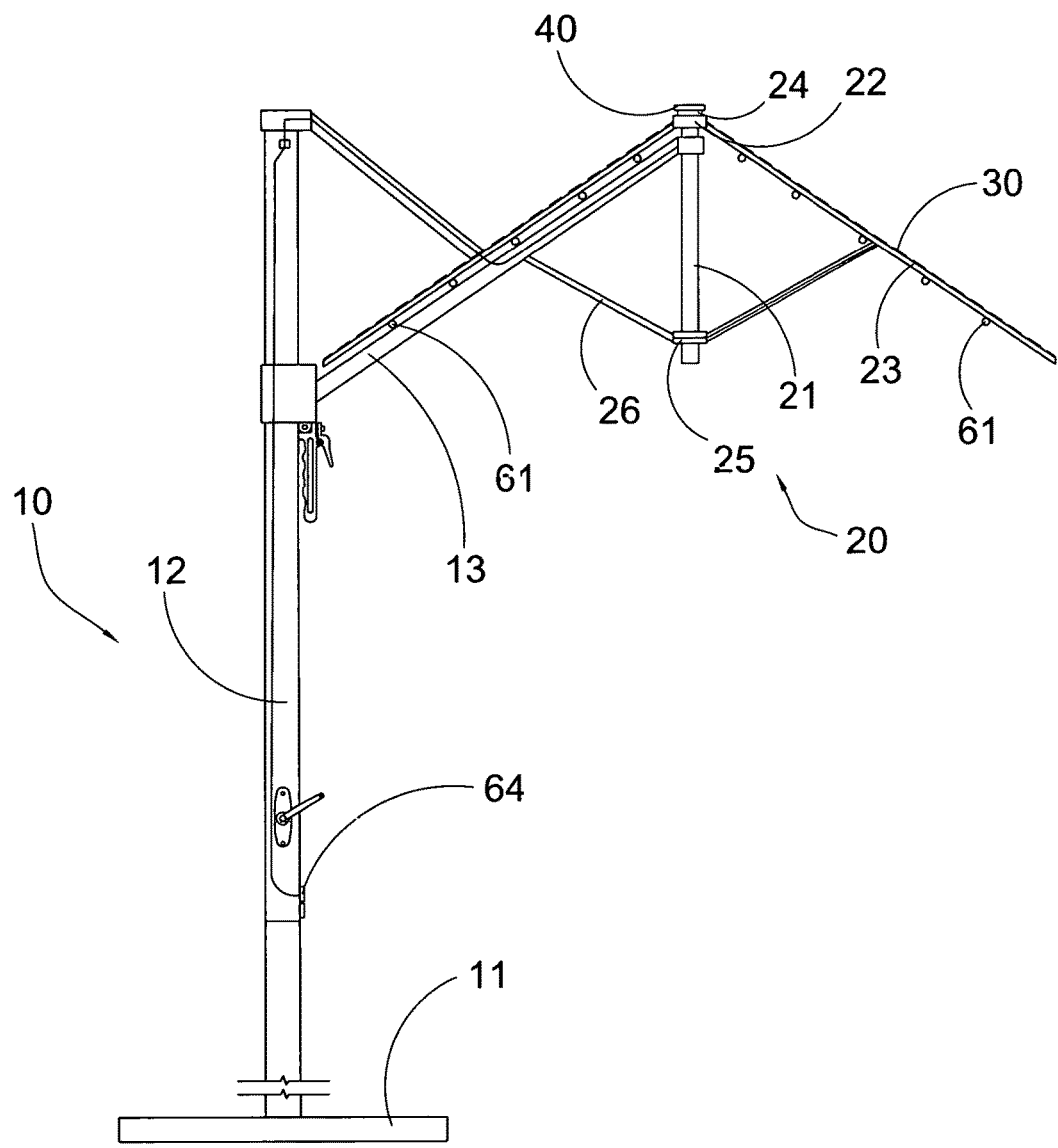
FIG. 1 is a schematic view of an umbrella according to the a preferred embodiment of the present invention, illustrating the umbrella as a cantilever umbrella.
Figure 2:
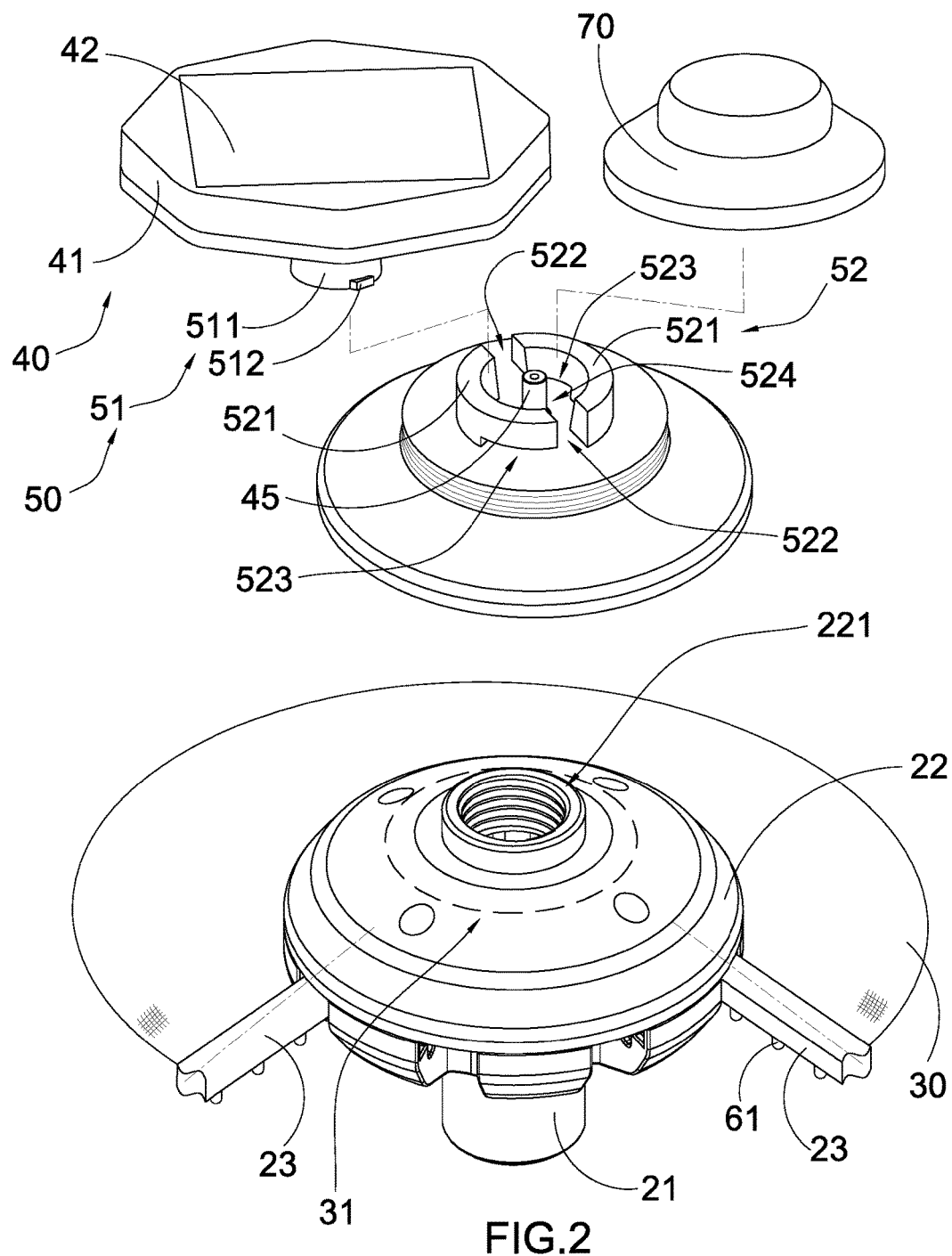
FIG. 2 is an exploded perspective view of an umbrella frame of the umbrella according to the preferred embodiment of the present invention.
Figure 3:
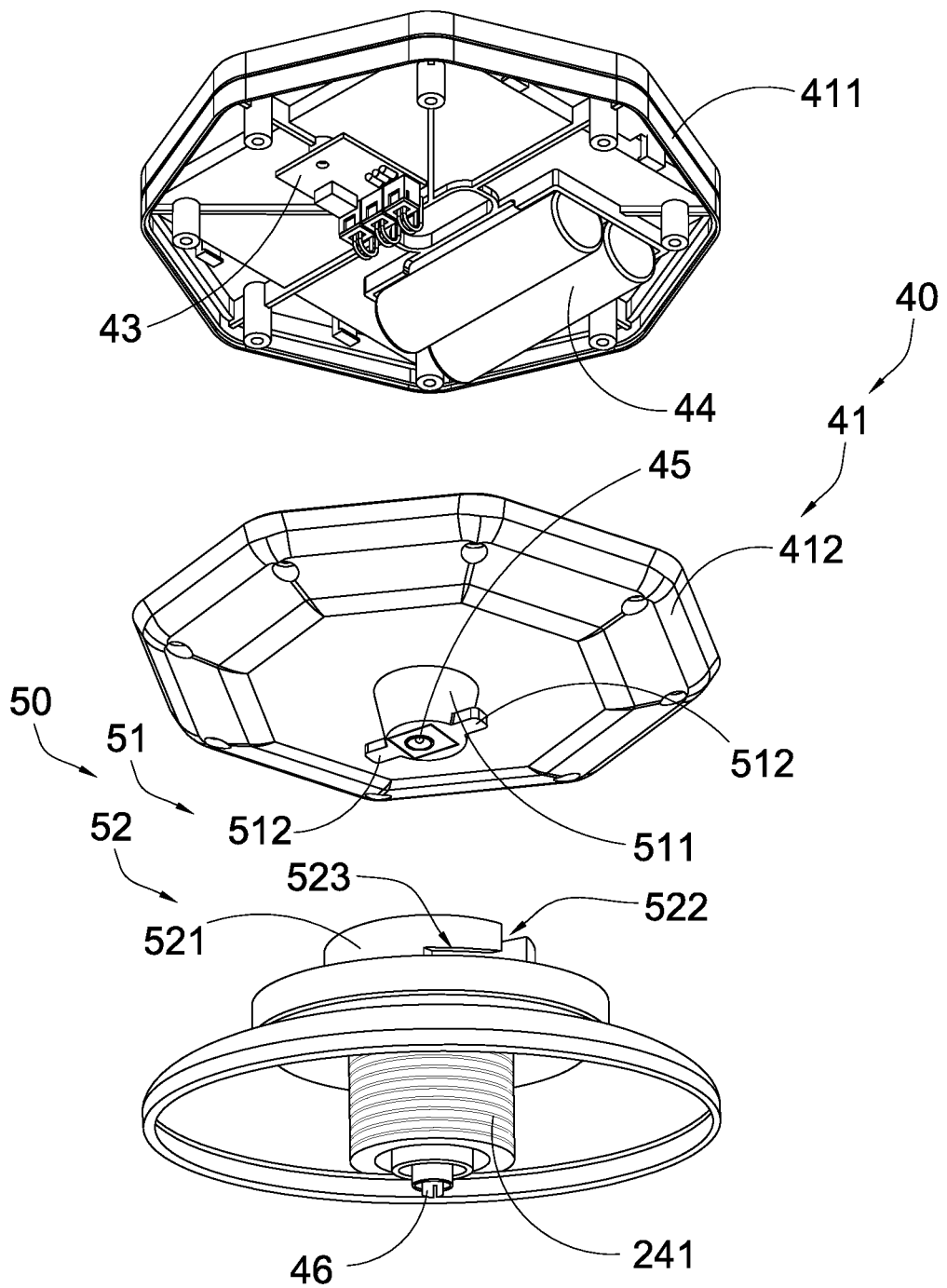
FIG. 3 is an exploded perspective view of an functional module of the umbrella according to the preferred embodiment of the present invention.
Figure 4:
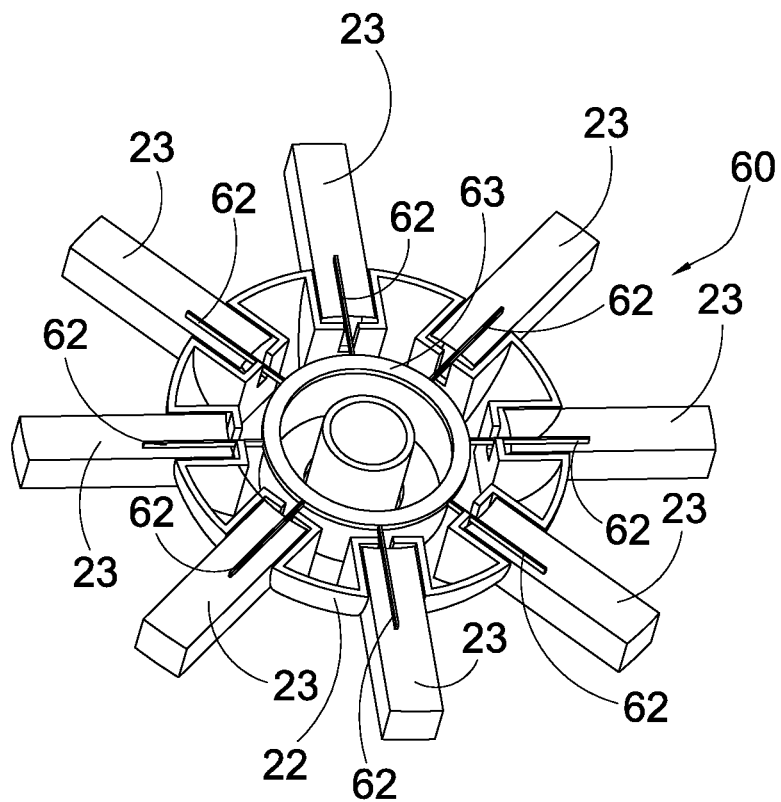
FIG. 4 is a perspective view of the wiring configuration of the upper hub of the umbrella according to the preferred embodiment of the present invention.

Referring to FIGS. 1 to 3, an umbrella according to a preferred embodiment of the present invention is illustrated, wherein the umbrella is embodied as an outdoor umbrella. In one embodiment, the umbrella is a cantilever umbrella. The umbrella comprises a supporting frame 10, an umbrella frame 20, an umbrella awning 30, and a functional module 40.

As shown in FIG. 1, the supporting frame 10 comprises a supporting base 11, an umbrella supporting pole 12 upwardly extended from the supporting base 11, and a cantilever arm 13 pivotally coupled at the umbrella supporting pole 12. The umbrella frame 20 is suspendedly supported at a free end of the cantilever arm 13. In other words, the supporting frame 10 is located at one side and the umbrella frame 20 that hangs off to the other side to form the cantilever umbrella.

The umbrella frame 20 comprises a guiding arm 21 coupled at the free end of the cantilever arm 13, an upper hub 22 securely coupled at a top end of the guiding arm 21, a plurality of awning arms 23 radially and pivotally extended from the upper hub 22, and an awning cap 24 detachably coupled on the upper hub 22 to enclose a top side of the upper hub 22. Accordingly, the umbrella frame 20 can be operated between a folded position by pivotally and downwardly folding the awning arms 23 from the upper hub 22, and an unfolded position by pivotally and upwardly folding the awning arms 23 from the upper hub 22. It is worth mentioning that the cantilever arm 13 is pivotally coupled between the umbrella supporting pole 12 and the guiding arm 21 to suspendedly support the guiding arm 21.

The umbrella frame 20 further comprises a lower hub 25 slidably coupled at the guiding arm 21 at a position below the upper hub 22, and a plurality of folding arms 26 pivotally and radially extended from the lower hub 25 to pivotally couple at the awning arms 23 respectively. When the umbrella frame 20 is operated at the folded position, the lower hub 25 is downwardly slid at the guiding arm 21 to drive the awning arms 23 to be pivotally and downwardly folded from the upper hub 22 via the folding arms 26. When the umbrella frame 20 is operated at the unfolded position, the lower hub 25 is upwardly slid at the guiding arm 21 to drive the awning arms 23 to be pivotally and outwardly folded from the upper hub 22 via the folding arms 26.

The umbrella awning 30 is made of waterproof and UV protection material, wherein the umbrella awning 30 is supported by the awning arms 23 to define a shading area under the umbrella awning 30. In particular, when the umbrella frame 20 is operated at the unfolded position, the awning arms 23 are outwardly extended from the upper hub 22 to stretch the umbrella awning 30 so as to provide the shading area. When the umbrella frame 20 is operated at the folded position, the awning arms 23 are downwardly extended from the upper hub 22 to fold up the umbrella awning 30 so as to minimize the shading area. It is worth mentioning that a center portion of the umbrella awning 30 is securely sandwiched between the upper hub 22 and the awning cap 24 to retain the umbrella awning 30 in position. In other words, the center portion of the umbrella awning 30 is secured between the upper hub 22 and the awning cap 24 while the peripheral portion of the umbrella awning 30 is secured by the awning arms 23.

As shown in FIG. 2, the upper hub 22 has a coupling slot 221 indently formed on the top side of the upper hub 22 and coaxially formed at a center thereof, wherein the coupling slot 221 has an inner threaded structure. Correspondingly, the awning cap 24 has a coupling shaft 241 downwardly and coaxially extended from a bottom side of the awning cap 24, wherein the coupling shaft 241 has an outer threaded structure that rotatably engages with the coupling slot 221 to detachably couple the awning cap 24 on the upper hub 22 so as to securely fasten the center portion of the umbrella awning 30 therebetween. It is worth mentioning that the umbrella awning 30 has a center through hole 31, wherein the coupling shaft 241 is extended through the center through hole 31 of the umbrella awning 30 to engage with the coupling slot 221 so as to sandwich the center portion of the umbrella awning 30 is secured between the upper hub 22 and the awning cap 24.

According to the preferred embodiment, the functional module 40 embodied as a solar module which comprises a functional housing 41 detachably coupled on the awning cap 24 and a solar cell 42 provided on a top side of the functional housing 41 for collecting solar energy. In other words, the umbrella of the present invention serves as a solar umbrella in one embodiment. The functional module 40 further comprises an energy converting circuit 43 supported in the functional housing 41 to operatively connect to the solar cell 42 for converting the solar energy into electrical energy, and a rechargeable battery 44 received in the functional housing 41 to operatively link to the energy converting circuit 43 for being charged by the solar energy. In other words, when the solar energy is converted into the electrical energy by the energy converting circuit 43, the electrical energy will be stored in the rechargeable battery 44.

As shown in FIG. 3, the functional housing 41 comprises an upper housing 411 and a lower housing 412 coupled with each other to define a functional chamber within the upper housing 411 and the lower housing 412, wherein the energy converting circuit 43 and the rechargeable battery 44 are supported in the upper housing 411 within the functional chamber. In addition, the solar cell 42 is coupled on top of the upper housing 411, such that the energy converting circuit 43 is electrically to the solar cell 42 through the top wall of the upper housing 411. It is appreciated that the rechargeable battery 44 can be supported in the upper hub 22 since the upper hub 22 is stationary with respect to the guiding arm 21.

According to the preferred embodiment, the functional housing 41 is coupled on the awning cap 24 via an attachment means 50 which comprises first and second attachment units 51, 52.

The first attachment unit 51 comprises an attachment shaft 511 downwardly extended from the bottom side of the functional housing 41 and two attachment wings 512 radially extended from the attachment shaft 511. In particular, the attachment shaft 511 is integrally extended from the bottom side of the functional housing 41, wherein the attachment wings 512 are outwardly and integrally extended from a bottom end of the attachment shaft 511, such that the first attachment unit 51 forms a T-shaped configuration.

The second attachment unit 52 comprises two arc-shaped attachment members 521 spacedly provided at the top side of said awning cap 24, wherein the arc-shaped attachment members 521 are aligned with each other end-to-end. Each of the arc-shaped attachment members 521, having a L-shaped configuration, has an extension portion integrally extended from the top side of the awning cap 24 and a raised portion extended from the extension portion to suspendedly support above the top side of the awning cap 24. Accordingly, two opening gaps 522 are defined between the two ends of the arc-shaped attachment members 521. In other words, each of the opening gaps 522 is formed between the ends of the arc-shaped attachment members 521. In addition, two attachment slots 523 are formed between bottom sides of the arc-shaped attachment members 521 and the top side of the awning cap 24. In other words, the attachment slots 523 are formed between the raised portions of the arc-shaped attachment members 521 and the top side of the awning cap 24, wherein the attachment slots 523 are communicated with the opening gaps 522 respectively. The second attachment unit 52 further has a shaft receiving cavity 524 defined within the arc-shaped attachment members 521 and the top side of the awning cap 24, wherein a size of the shaft receiving cavity 524 is slightly larger than a diameter size of the attachment shaft 511.

When the attachment shaft 511 is disposed in the shaft receiving cavity 524 at a position that the attachment wings 512 are disposed at the opening gaps 522 respectively, the first attachment unit 51 is rotated to slidably engage the attachment wings 512 with the attachment slots 523 respectively so as to couple the functional housing 51 on the awning cap 24. Likewise, when the first attachment unit 51 is rotated to slide the attachment wings 52 along the attachment slots 523 at the opening gaps 522 respectively, the first attachment unit 51 can be detached from the second attachment unit 52 so as to allow the functional housing 51 from the awning cap 24. It is worth mentioning that when the functional housing 51 is detached from the awning cap 24, the center portion of the umbrella awning 30 is still securely sandwiched between the upper hub 22 and the awning cap 24, such that the umbrella frame 20 can still be operated to move between the folded position and the unfolded position without the functional housing 51.

Accordingly, the umbrella of the present invention further comprises an electrical appliance supported within the shading area. According to the preferred embodiment, the electrical appliance is embodied as a light appliance 60, as an example, supported by the umbrella frame 20 for illuminating the shading area under the umbrella awning 30.

The light appliance 60 comprises a plurality of light strings 61 coupled along the awning arms 23 respectively and a plurality of wiring cables 62 electrically extended from the light strings 61 into the upper hub 22, wherein the light strings 61 are electrically connected to the functional module 40 via the wiring cables 62. Accordingly, the light strings 61 are attached along the bottom side of the awning arms 23 respectively, wherein each of the light strings 61 has a plurality of light elements electrically linked with each other. Preferably, each of the light strings 61 is a LED light string that the LED, i.e. the light elements, are electrically linked with each other along the respective awning arm 23.

The light appliance 60 is electrically connected to the functional module 40 via a contacting structure. In particular, the functional module 40 further comprises a first contacting terminal 45 provided at a bottom side of the functional housing 41 to electrically connect to the rechargeable battery 44 and a second contacting terminal 46 provided at the top side of the awning cap 24, such that when the functional housing 41 is coupled on the awning cap 24, the first and second contacting terminals 45, 46 are electrically contacted with each other, so as to electrically connect the light appliance 60 to the functional module 40.

As shown in FIGS. 2 and 3, the first contacting terminal 45 is provided at the bottom end of the attachment shaft 511 to electrically extend to the rechargeable battery 44. The second contacting terminal 46 is provided at the shaft receiving cavity 524, such that when the attachment shaft 511 is disposed in the shaft receiving cavity 524 to alignedly dispose the attachment wings 512 at the opening gaps 522 respectively, the first and second contacting terminals 45, 46 are electrically contacted with each other. It is worth mentioning that the wiring cables 62 are operatively extended to the second contacting terminal 46 through the upper hub 22. In other words, the second contacting terminal 46 is coaxially extended from the awning cap 24 through the coupling shaft 241. When the coupling shaft 241 is rotatably engaged with the coupling slot 221 to detachably couple the awning cap 24 on the upper hub 22, the second contacting terminal 46 is extended into the upper hub 22, such that the wiring cables 62 are radially extended into the upper hub 22 to operatively link to the second contacting terminal 46.

Preferably, the light appliance 60 further comprises a light controlling circuit board 63 having a ring-shape disposed in the upper hub 22, wherein inner ends of the wiring cables 62 are electrically connected to the light controlling circuit board 63. Therefore, when the coupling shaft 241 is rotatably inserted into the upper hub 22 through the coupling slot 221, the second contacting terminal 46 is extended into the upper hub 22 to electrically conduct with the light controlling circuit board 63.

In addition, the light appliance 60 further comprises a control switch 64 supported at the umbrella supporting pole 12 at a reachable height for controlling the light strings 61 in an on-and-off manner. Accordingly, the control switch 64 is electrically connected to the light controlling circuit board 63 via a wire extending through an interior of the supporting frame 10. It is appreciated that the control switch 64 can be supported by the umbrella frame 20, such as under the upper hub 22 or at the guiding arm 21 for the user to operate the light appliance 60. It is worth mentioning that the electrical appliance can be an electric fan appliance supported by the umbrella frame 20 for ventilating the shading area under the umbrella awning 30.

As it is mentioned above, the umbrella frame 20 can be operated to move between the folded position and the unfolded position without the functional housing 51. Accordingly, the umbrella of the present invention further comprises a covering cap 70 detachably coupled on the awning cap 24 when the functional module 40 is detached therefrom. As shown in FIG. 2, the awning cap 24 further comprises an annular brim 242 upwardly extended from the top side of said awning cap 24, wherein the second attachment unit 52 is encircled within the annular brim 242. A rim of the covering cap 70 is rotatably coupled at the annular brim 242 via a threaded structure to enclose the second attachment unit 52. In particular, the second contacting terminal 46 is sealed and enclosed when the covering cap 70 is detachably coupled on the awning cap 24.

Figure 5:
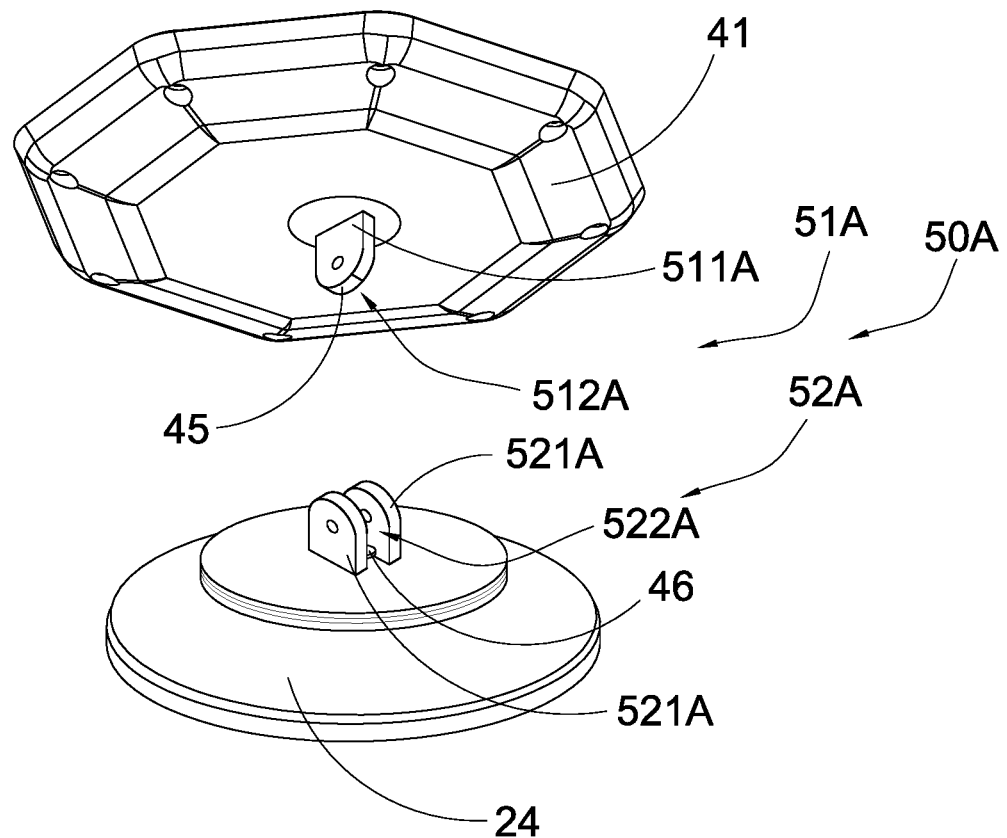
FIG. 5 illustrates an alternative mode of the first and second attachment units of the umbrella according to the preferred embodiment of the present invention.

FIG. 5 illustrates an alternative mode of the attachment means 50A which comprises first and second attachment units 51A, 52A. The first attachment unit 51A is downwardly extended from the bottom side of the functional housing 41 and the second attachment unit 52A is provided at the top side of the awning cap 24 to pivotally couple with the first attachment unit 51A, so as to pivotally couple the functional housing 41 on the awning cap 24.

In particular, the first attachment unit 51A comprises an attachment shaft 511A having a curved bottom surface 512A, wherein the first contacting terminal 45 is provided at the curved bottom surface 512A of the attachment shaft 511A to electrically extend to the rechargeable battery 44. The second attachment unit 52A comprises two attachment members 521A upwardly and parallelly extended from the top side of the awning cap 24 to define an attachment slot 522A between the attachment members 521A, wherein the attachment shaft 511A is slidably inserted into the attachment slot 522A to pivotally couple between the attachment members 521A. Accordingly, the second contacting terminal 46 is provided on the top side of the awning cap 24 at a position within the attachment slot 522A, such that when the attachment shaft 511A is slidably engaged with the attachment slot 522A, the first contacting terminal 45 is electrically conducted with the second contacting terminal 46. It is worth mentioning that since the first contacting terminal 45 is provided at the curved bottom surface 512A of the attachment shaft 511A, the pivotal movement of the functional housing 41 with respect to the awning cap 24 will keep the electrical conduction between the first and second contacting terminals 45, 46.

Figure 6:
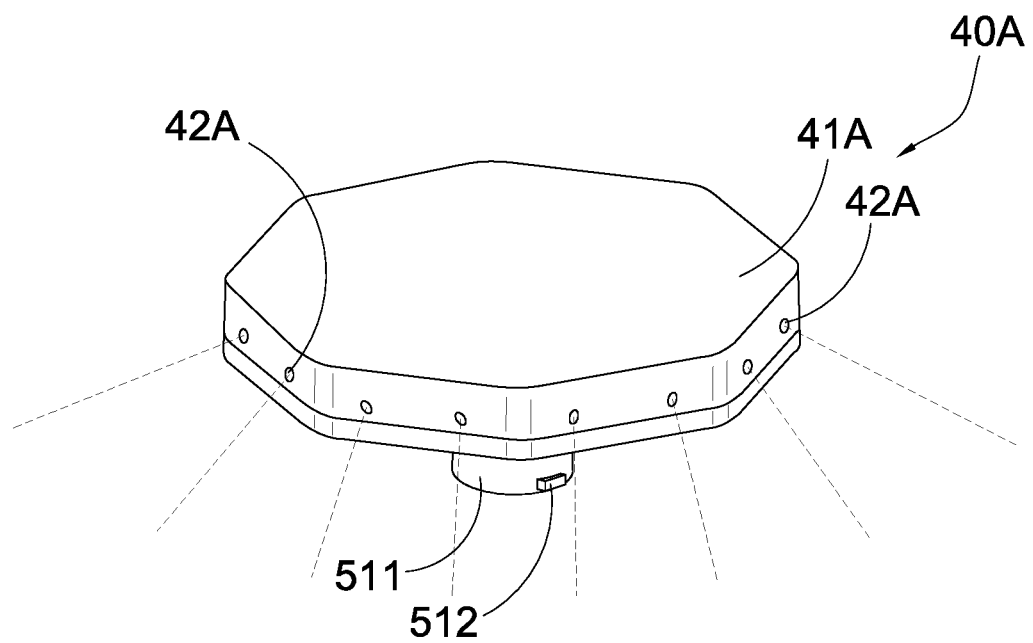
FIG. 6 illustrates alternative mode of the functional module of the umbrella according to the preferred embodiment of the present invention.

The functional module 40 can also serve as a speaker module, a lighting module, a mist generating module, and etc. Referring to FIG. 6, an alternative mode of the functional module 40A is illustrated, wherein the functional module is embodied as a mist generating module 40A, which comprises a functional housing 41A detachably coupled on the awning cap 24 and one or more mist nozzles 42A provided on the functional housing 41A for generating mists on the umbrella awning 30. In other words, the umbrella of the present invention serves as an outdoor cooling umbrella. Accordingly, a water supplying source is operatively connected to the mist nozzles 42A via a water duct which is extended along the supporting frame 10. For example, the water duct can be connected to a water outlet, such that the water can be guided to the mist nozzles 42A by water pressure for generating mists on the umbrella awning 30. It is worth mentioning that the mists are applied on the top side of the umbrella awning 30 to cool down the temperature of the shading area without directly applying the mists within the shading area.

Figure 7:
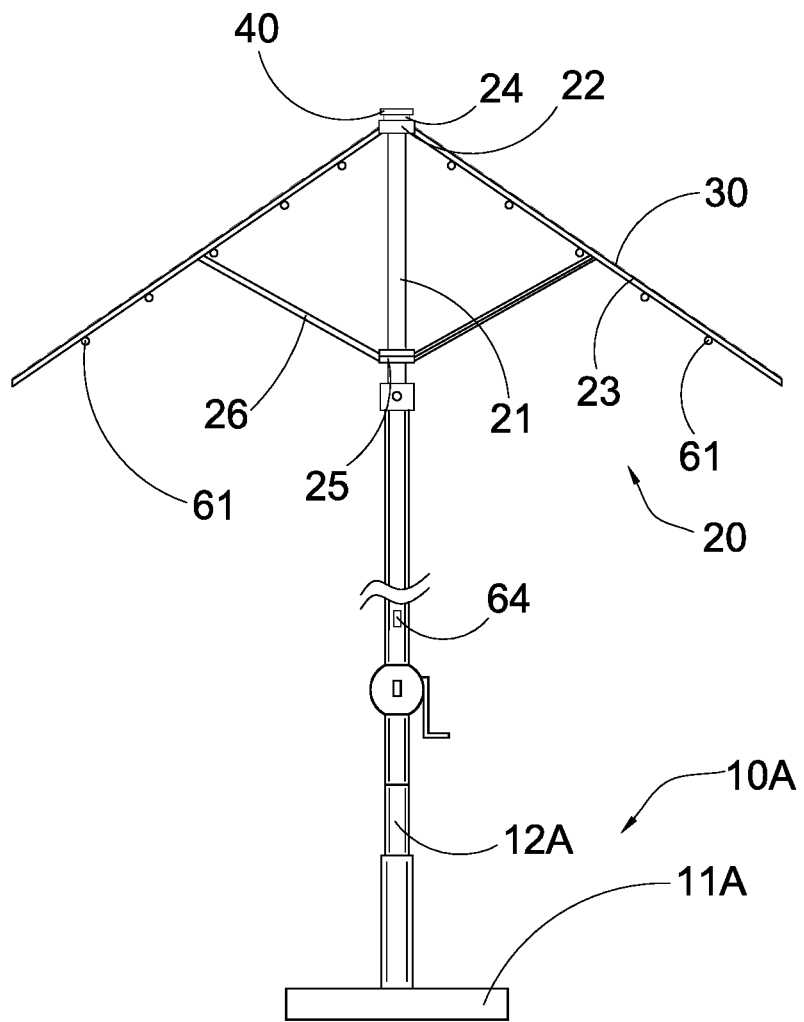
FIG. 7 illustrates an alternative mode of the supporting frame of the umbrella according to the preferred embodiment of the present invention, illustrating the umbrella as a standard pole umbrella.

FIG. 7 illustrates an alternative mode of the supporting frame 10A, wherein the umbrella is embodied as a standard pole umbrella. The supporting frame 10A comprises a supporting base 11A and an umbrella supporting pole 12A upwardly extended from the supporting base 11A, wherein the umbrella supporting pole 12A has an upper end coupled at a bottom end of the guiding arm 21. Preferably, the upper end of the umbrella supporting pole 12A is pivotally coupled to the bottom end of the guiding arm 21, such that the shading area of the umbrella awning 30 can be selectively adjusted via the pivotal movement of the guiding arm 21 with respect to the umbrella supporting pole 12A.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An umbrella, comprising:

a supporting frame;

an umbrella frame, which is supported by said supporting frame, comprising a guiding arm, an upper hub securely coupled at a top end of said guiding arm, a plurality of awning arms radially and pivotally extended from said upper hub, and an awning cap detachably coupled on said upper hub;

an umbrella awning supported by said awning arms to define a shading area under said umbrella awning, wherein a center portion of said umbrella awning is securely sandwiched between said upper hub and said awning cap to retain said umbrella awning in position, wherein said upper hub has a coupling slot, and said awning cap has a coupling shaft rotatably engaged with said coupling slot to detachably couple said awning cap on said upper hub so as to securely fasten said center portion of said umbrella awning therebetween; and a functional module detachably coupled on said awning cap, wherein said functional module comprises a functional housing detachably coupled on said awning cap and a solar cell provided on said functional housing for collecting solar energy, wherein said functional module further comprises a rechargeable battery received in said functional housing for being charged by said solar energy, wherein said functional module further comprises a first contacting terminal provided at a bottom side of said functional housing to electrically connect to said rechargeable battery and a second contacting terminal provided at a top side of said awning cap, such that when said functional housing is coupled on said awning cap, said first and second contacting terminals are electrically contacted with each other.

2. The umbrella, as recited in clam 1, further comprising a light appliance electrically connected to said functional module, wherein said light appliance comprises a plurality of light strings coupled along said awning arms respectively and a plurality of wiring cables electrically extended from said light strings to said second contacting terminal through said upper hub.

3. An umbrella, comprising:

a supporting frame;

an umbrella frame, which is supported by said supporting frame, comprising a guiding arm, an upper hub securely coupled at a top end of said guiding arm, a plurality of awning arms radially and pivotally extended from said upper hub, and an awning cap detachably coupled on said upper hub;

an umbrella awning supported by said awning arms to define a shading area under said umbrella awning, wherein a center portion of said umbrella awning is securely sandwiched between said upper hub and said awning cap to retain said umbrella awning in position; and a functional module detachably coupled on said awning cap, wherein said functional module, which serves as a solar module, comprises a functional housing detachably coupled on said awning cap and a solar cell provided on said functional housing for collecting solar energy, wherein said functional module further comprises a rechargeable battery received in said functional housing for being charged by said solar energy, wherein said functional module further comprises a first contacting terminal provided at a bottom side of said functional housing to electrically connect to said rechargeable battery and a second contacting terminal provided at a top side of said awning cap, such that when said functional housing is coupled on said awning cap, said first and second contacting terminals are electrically contacted with each other, wherein said functional housing is coupled on said awning cap via first and second attachment units, wherein said first attachment unit comprises an attachment shaft downwardly extended from said bottom side of said functional housing and two attachment wings radially extended from said attachment shaft, wherein said second attachment unit comprises two arc-shaped attachment members provided at said top side of said awning cap to define two opening gaps between two ends of said arc-shaped attachment members and two attachment slots between bottom sides of said attachment members and said top side of said awning cap, such that when said attachment wings are disposed at said opening gaps respectively, said first attachment unit is rotated to slidably engage said attachment wings with said attachment slots so as to couple said functional housing on said awning cap.

4. The umbrella, as recited in claim 3, wherein said first contacting terminal is provided at said attachment shaft, wherein said second attachment unit further has a shaft receiving cavity defined within said arc-shaped attachment members that said second contacting terminal is provided at said shaft receiving cavity, such that when said attachment shaft is disposed in said shaft receiving cavity to alignedly dispose said attachment wings at said opening gaps respectively, said first and second contacting terminals are electrically contacted with each other.

5. An umbrella, comprising:

a supporting frame, an umbrella frame, which is supported by said supporting frame, comprising a guiding arm, an upper hub securely coupled at a top end of said guiding arm, a plurality of awning arms radially and pivotally extended from said upper hub, and an awning cap detachably coupled on said upper hub;

an umbrella awning supported by said awning arms to define a shading area under said umbrella awning, wherein a center portion of said umbrella awning is securely sandwiched between said upper hub and said awning cap to retain said umbrella awning in position; and a functional module detachably coupled on said awning cap, wherein said functional module, wherein said functional module comprises a functional housing detachably coupled on said awning cap and one or more mist nozzles provided on said functional housing for generating mists on said umbrella awning.

\* \* \* \* \*